J. F. GOLDING.
UTILIZATION OF SCRAP METAL IN THE MANUFACTURE OF WASHERS.
APPLICATION FILED NOV. 16, 1915.
1,210,928.
Patented Jan. 2, 1917.
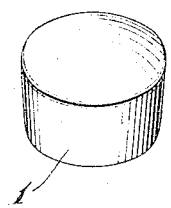
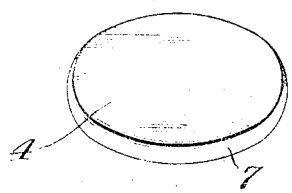
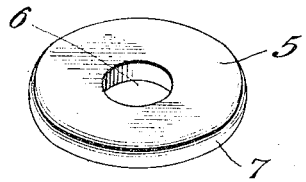
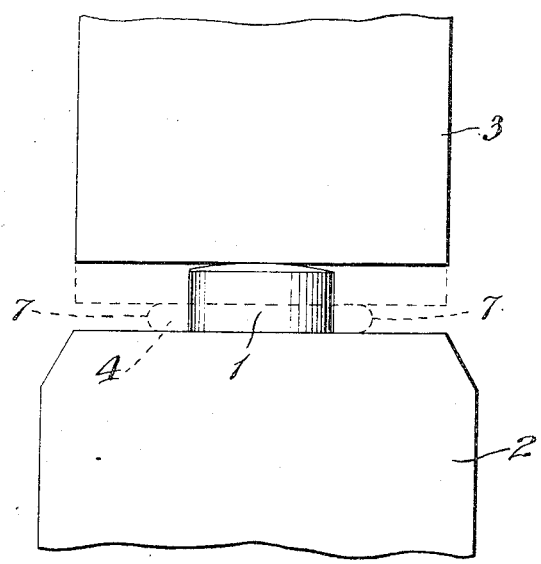
Witness
Marshall Low
Inventor
John F. Golding
By H N Low
Attorney

UNITED STATES PATENT OFFICE.

JOHN F. GOLDING, OF WASHINGTON, DISTRICT OF COLUMBIA.

UTILIZATION OF SCRAP METAL IN THE MANUFACTURE OF WASHERS.

1,210,928.  Specification of Letters Patent.  Patented Jan. 2, 1917.

Application filed November 16, 1915. Serial No. 61,765.

*To all whom it may concern:*

Be it known that I, JOHN F. GOLDING, a citizen of the United States, residing at Washington, in the District of Columbia, have invented certain new and useful Improvements in the Utilization of Scrap Metal in the Manufacture of Washers, of which the following is a specification.

My invention relates to the utilization of a certain class of scrap metal for the production of washers.

There is a large quantity of disk like scrap metal resulting from punching holes in plates, sheets or other forms of rolled metal. Heretofore such disk like punchings have had no commercial value above that of scrap metal such as is used for remelting.

Washers have heretofore been produced by punching them of desired diameter from plates or sheets of metal which have been previously rolled to the thickness required for the washer. The practice of the old method results in the production of a large amount of perforated scrap sheet metal (estimated at about 30% of the total sheet), of low scrap value due to its being bulky and inconvenient for remelting. Such is not the case however in the practice of my method, there being no scrap produced excepting the small central disk resulting from perforating the pressed washer, and these small punchings are of as great a value per pound weight as the original punchings from which my washers are made. There is therefore great economy effected by my process of producing washers.

The steps taken in the manufacture of washers by my method are as follows: I take the said punchings and reduce them by pressure to the thickness and diameter required for the washers. This pressing operation may be performed upon the scrap disks either when they are cold or after they have been heated. Thereafter there is ordinarily nothing further to be done but to punch the aperture in the washer. If desired the washer may in some cases be trimmed circumferentially at the same operation.

There may be some irregularities in the scrap disks in respect of burs, fins or projections along and around their edges, produced by the punching operation, and preferably the disks are preliminarily tumbled to take away said burs, so that the disks will lie evenly on the anvil of the pressing machine and washers properly finished around the periphery will be produced. In some cases the washers, after they have been perforated, may also be tumbled to take away any sharp edges that may result from such punching and trimming.

In order to make the invention more clearly understood I have shown in the accompanying drawings means for carrying the same into practical effect, without limiting the improvements, in their useful applications, to the particular construction which, for the purpose of example, has been made the subject of illustration.

In said drawings—Figure 1 is a perspective view of a scrap disk punching suitable for use in carrying my invention into effect. Fig. 2 is a side view, in the nature of a diagram, illustrating the pressing apparatus and operation. Fig. 3 is a perspective view of the washer blank after the pressing operation. Fig. 4 is a perspective view of the finished washer.

Referring to the drawings, 1 indicates the metal scrap disk punching.

2 indicates the anvil and 3 the hammer, plunger or movable part of the pressing apparatus. By this apparatus the disk 1 is reduced to the proper thickness and diameter, as indicated by dotted lines in Fig. 2.

4 indicates the reduced washer blank, and 5 the finished washer after it has been perforated with the hole 6.

The pressing operation expands the scrap disk radially to the diameter required as well as reduces the same to the desired thickness. This operation also rounds the blank 4 at its periphery, in a direction from one face to the other of the blank as shown at 7. For many classes of washers this configuration of the edge is desirable, and is produced by the pressing operation without the expense of any further procedure.

When washers are punched out from a flat sheet of rolled metal, according to the usual method of manufacture, the action of the punching dies sets up strains in the metal of the washers so that they are sometimes distorted or warped out of shape and are not perfectly flat. But according to my invention the washer blank is produced perfectly true and plane on both surfaces and is therefore also suitable for a higher grade of service than plate washers as they are punched from sheet metal.

What I claim is:

The herein described process of utilizing solid and imperforate scrap disk punchings, of the punch-sheared form which they normally assume in being punched from metal plate, for the production of metal washers, which consists in reducing such individual solid punchings by axial pressure between opposing continuous die surfaces and causing all the metal therein, excepting that at the immediate center of the disk, to flow under such pressure radially, freely and uniformly outward in all directions so that the disk is expanded until the desired diameter of the washer has been attained and the same has been duly flattened, and then perforating such reduced disks.

In testimony whereof I affix my signature.

JOHN F. GOLDING.